United States Patent
Grubisic et al.

(10) Patent No.: US 11,077,964 B1
(45) Date of Patent: Aug. 3, 2021

(54) HIGH-TEMPERATURE ELECTROTHERMAL PROPULSION SYSTEM

(71) Applicant: H.C. STARCK INC., Newton, MA (US)

(72) Inventors: Angelo Niko Grubisic, Southampton (GB); Federico Romei, Pergola (IT)

(73) Assignee: H.C. STARCK INC., Newton, MA (US)

( * ) Notice: Subject to any disclaimer, the term of this patent is extended or adjusted under 35 U.S.C. 154(b) by 202 days.

(21) Appl. No.: 15/977,036

(22) Filed: May 11, 2018

Related U.S. Application Data

(60) Provisional application No. 62/505,169, filed on May 12, 2017.

(51) Int. Cl.
*B64G 1/40* (2006.01)
*B33Y 80/00* (2015.01)

(52) U.S. Cl.
CPC .............. *B64G 1/406* (2013.01); *B33Y 80/00* (2014.12)

(58) Field of Classification Search
CPC . F03H 1/00; F03H 1/00; F03H 1/0012; F03H 1/0031; F03H 1/0093; B64G 1/406
See application file for complete search history.

(56) References Cited

U.S. PATENT DOCUMENTS 4,577,461 A * 3/1986 Cann .................... F01H 1/00

OTHER PUBLICATIONS

Hoffman "Compositionally graded metals: A new frontier of additive manufacturing" (Year: 2014).*
A Xenon Resistojet Propulsion System for Microsatellite (Year: 2005).*
Electron beam freeform fabrication A rapid metal deposition process (Year: 2003).*
Life Test of Six High Temperature Resistojets (Year: 1969).*
The design and performance of a 3kw concentric tube resistojet final report (Year: 1965).*

* cited by examiner

*Primary Examiner* — Gerald L Sung
*Assistant Examiner* — William L Breazeal
(74) *Attorney, Agent, or Firm* — Morgan, Lewis & Bockius LLP

(57) ABSTRACT

In various embodiments, an electrothermal propulsion system for imparting velocity to a spacecraft features a joint-free monolithic integrated thruster component including an inlet section, a resistively heated heat-exchanger section, and a nozzle section.

25 Claims, 8 Drawing Sheets

HIGH-TEMPERATURE ELECTROTHERMAL PROPULSION SYSTEM

RELATED APPLICATION

This application claims the benefit of and priority to U.S. Provisional Patent Application No. 62/505,169, filed May 12, 2017, the entire disclosure of which is hereby incorporated herein by reference.

TECHNICAL FIELD

In various embodiments, the present invention relates to propulsion systems for spacecraft, and in particular to such systems fabricated at least in part by additive manufacturing.

BACKGROUND

Electrothermal propulsion systems for spacecraft work on the principle of increasing the enthalpy of a propellant through the addition of electrical power. Enthalpy is energetically traded for kinetic power of the propellant as it is accelerated through a nozzle to produce thrust. "Resistojet" thrusters work on this principle by electrically heating the propellant via a resistive element and expelling the propellant (e.g., expanded gas) through the nozzle. The propellant exit velocity of a resistojet thruster typically increases proportionally to the square root of the gas temperature. A schematic of a typical resistojet is depicted in FIG. 1. As shown, in a conventional resistojet 100, power from a power source 110 is applied to a resistive heater 120, which in turn heats the propellant, entering via a propellant inlet 130, via a separate, non-integrated heat exchanger 140. The heated propellant is expelled through a nozzle 150.

Resistojets and other electrical propulsion systems typically provide a smaller impulse bit (i.e., the minimum impulse deliverable by the thruster) than chemical propulsion systems, making them better suited for fine positioning spacecraft maneuvers. Conventional resistojets operate at temperatures of less than 1000 K; however, operation at higher temperatures would provide higher fuel efficiency and thus significant savings in fuel mass (and thus payload necessary to launch into space). Thus, there is a need for resistojet designs, and related fabrication techniques for such designs, that enable higher-temperature operation while minimizing viscous and heat losses and retaining structural integrity at the high operating temperatures.

SUMMARY

Embodiments of the present invention feature a resistojet thruster (or simply "resistojet") capable of raising the stagnation temperature of a propellant to very high temperatures (e.g., up to approximately 3000 K or higher). In various embodiments, the resistojet has a total thruster efficiency in the range of approximately 65% to approximately 90% during high-temperature operation. An exemplary propellant utilized by resistojets in accordance with embodiments of the invention is xenon gas, although other propellants may also be used (e.g., other gases such as argon (or other inert gases), butane, or nitrogen). In various embodiments, particularly those in which xenon gas is utilized as the propellant, the specific impulse achieved by the resistojet (per unit weight of the propellant) ranges from approximately 60 seconds to approximately 100 seconds, or from approximately 70 seconds to approximately 90 seconds, or from approximately 75 seconds to 85 seconds.

Given the high operating temperatures of the resistojet, in various embodiments one or more portions of the resistojet include, consist essentially of, or consist of one or more refractory metals (e.g., niobium, molybdenum, tantalum, tungsten, or rhenium) or alloys including, consisting essentially of, or consisting of two or more refractory metals, or one or more refractory metals with one or more additional metals, as long as the alloy exhibits a suitably high melting point (e.g., 1400° C. or greater). In various embodiments, the melting point of the metal of which the resistojet (or at least the thruster component thereof) is composed has a melting point higher than the stagnation temperature at which the resistojet is operated. In various embodiments, the melting point may be approximately 3450° C. or less.

In various embodiments, the metal or alloy of at least a portion of the resistojet (e.g., the thruster component) exhibits a low change in resistivity (e.g., ±20%, ±10%, ±5%, ±2%, or even ±1%) as a function of temperature (e.g., between 0° C. and 3000° C.), as this enables substantially constant power operation at a fixed voltage. In such embodiments, any electronics for power regulation may be advantageously reduced in number or omitted entirely, thereby providing a reduction in weight of the resistojet (leading to concomitant reductions in the cost and propellant required to launch the resistojet into space). In various embodiments, the metal or alloy of at least a portion of the resistojet (e.g., the thruster component) exhibits substantial ductility and/or toughness at high temperatures (e.g., the operating temperature of the resistojet or the stagnation temperature of the propellant), high mechanical strength at elevated temperatures (e.g., greater than approximately 10 ksi at the stagnation temperature of operation), and/or significant resistance to thermal stress or shock. In various embodiments, the metal or alloy of at least a portion of the resistojet (e.g., the thruster component) has a fairly low coefficient of thermal expansion (e.g., less than approximately $4 \times 10^6$ $K^{-1}$). In various embodiments, the metal or alloy of at least a portion of the resistojet (e.g., the thruster component) has a fairly high electrical resistivity (e.g., greater than approximately 500 µΩ-m at 20° C.).

In various embodiments, the resistojet features a monolithic thruster component that includes an inlet section for receiving a fluidic (e.g., gaseous) propellant, an integrated heat-exchanger and resistive heating section for heating the propellant, and a nozzle section for expelling the heated (and thus typically expanded) propellant to impart velocity to a spacecraft. The heat-exchanger section is typically composed of multiple concentric tubes, and the walls of the tubes resistively heat the propellant as it traverses the tubes along a sinuous path toward the nozzle section. A power source applies electrical potential on either side of the heat-exchanger section (e.g., between the inlet section and the nozzle section), thereby enabling the resistive heating.

In various embodiments, the thruster component is fabricated as a seamless monolithic part, i.e., a unitary part without internal joints formed by, for example, welds or other connectors not formed of the material of the thruster component and not integrally formed with the thruster component as it is being fabricated. As utilized herein, the term "joint" refers to a point where two components or portions of a component are joined together by a joining technique such as, e.g., welding, adhesion, local melting, brazing, etc.; while joints may be at least partially composed of a material different from at least one of the components, even joints composed of the same material as the joined components will typically have a local microstructure and/or one or more physical properties (e.g., hardness, crystal structure, etc.) different from those of the joined components away from the joint, and such properties may be straightforwardly determined by one of skill in the art using conventional materials inspection techniques without undue experimentation. As utilized herein, the term "monolith" refers to a single unitary component that is free of joints and seams, at least internally. A monolith or monolithic component may be joined to other components of a system, if necessary, utilizing any of a variety of different techniques. In various embodiments, the thruster component is a monolith having a substantially uniform microstructure, i.e., a microstructure free of detectable heat-affected zones (i.e., areas of different microstructure and/or physical properties that may result from, e.g., welding or other high-temperature joining processes) and possessing a substantially uniform crystal structure (i.e., a crystal structure without detectable variation in crystal structure, texture, or grain size), density, and hardness. The microstructure may have a dendritic component with dendrites oriented substantially along the direction of fabrication (e.g., substantially parallel to the tubular walls of the thruster component). The dendritic component of the microstructure may arise from rapid cooling enabled by various additive manufacturing techniques that may be utilized to fabricate the thruster component in accordance with embodiments of the invention. In embodiments in which a laser is utilized to melt metal material to form the thruster component, the microstructure of the thruster component may exhibit linear structures oriented along the direction of laser travel along or within the part, and/or the microstructure may exhibit solidified molten-pool boundaries, which may or may not overlap with each other, that correspond to the pixel-like molten pools formed as the laser is scanned across the working area to form the part.

The thruster component may be fabricated by additive manufacturing (or three-dimensional (3D) printing) techniques as a unitary component, thereby obviating the need for the formation of internal joints within or between the various sections of the thruster component. In general, additive manufacturing involves the layer-by-layer deposition of material by computer control to form a three-dimensional object, in this case the resistojet thruster. For example, the thruster component may be fabricated by selective laser melting of metallic powder feedstock within a powder bed. In other embodiments, metallic wire feedstock is utilized to form the three-dimensional part in, e.g., layer-by-layer fashion. A tip of the wire may be translated relative to a platform (i.e., the wire may be translated, the platform may be translated, or both may be translated). During the relative translation, the tip of the wire may be melted using an energy source to form a molten bead. The bead may cool to form at least a portion of a layer of the thruster component, and these steps may be repeated one or more times to produce at least a portion of the thruster component. In yet other embodiments, a printing head is utilized to disperse a liquid binder or adhesive (typically a polymer material) into a powder bed of metallic feedstock powder layer-by-layer in approximately the desired shape and size for the thruster component. After each layer, the binder may be cured by, e.g., application of heat or light. After the printing is complete, the thruster component is made of the powder particles held together by the binder material. The thruster component may then be sintered to fuse the particles together and decompose (i.e., burn off) the binder material, resulting in a densified part.

Metallic feedstock materials that may be used in accordance with embodiments of the present invention include densified, flowable powders manufactured in accordance with U.S. patent application Ser. Nos. 15/835,519 and 15/835,520, both filed on Dec. 8, 2017, the entire disclosures of which are incorporated by reference herein. Suitable feedstock materials also include metallic wires manufactured in accordance with U.S. patent application Ser. Nos. 15/416,253 and 15/416,254, both filed on Jan. 26, 2017, and U.S. patent application Ser. Nos. 15/446,489 and 15/446,491, both filed on Mar. 1, 2017, the entire disclosures of which are incorporated by reference herein.

As utilized herein, a "spacecraft" is a manned or unmanned vehicle designed for travel or operation in space beyond the earth's atmosphere or in orbit around the earth, e.g., a satellite, a space probe, a space capsule, etc.

In an aspect, embodiments of the invention feature an electrothermal propulsion system for imparting velocity to a spacecraft. The system includes, consists essentially of, or consists of a joint-free, monolithic, integrated thruster component and a power source. The thruster component defines an inlet section, a heat-exchanger section, and a nozzle section. The inlet section receives fluidic propellant. The heat-exchanger section heats propellant received from the inlet section. The heat-exchanger section includes, consists essentially of, or consists of a plurality of concentric tubes fluidly and electrically connected to each other (e.g., the tubes form a single fluidic path for propellant flow and at least neighboring tubes are connected together at least for electrical continuity). The nozzle section receives heated propellant from the heat-exchanger section and expels it. The power source applies electrical potential across the heat-exchanger section (e.g., between the inlet section and the nozzle section) to resistively heat the heat-exchanger section. No joints are present between any of the inlet section, the heat-exchanger section, and the nozzle section of the thruster component. Embodiments of the invention may include one or more of the following in any of a variety of combinations. The thruster component may include, consist essentially of, or consist of one or more refractory metals. A wall thickness of at least one of the tubes of the heat-exchanger section may be no more than 800 µm, no more than 700 µm, no more than 600 µm, no more than 500 µm, no more than 400 µm, no more than 300 µm, no more than 200 µm, or no more than 100 µm. The thruster component may be fabricated by an additive manufacturing technique. The additive manufacturing technique may include, consist essentially of, or consist of layer-by-layer melting of a metal wire. The additive manufacturing technique may include, consist essentially of, or consist of layer-by-layer melting or sintering of metal powder disposed in a powder bed. A first portion of the heat-exchanger section (e.g., the inlet section, one or more tubes, and/or the nozzle section) may have a first composition. A second portion of the heat-exchanger section different from the first portion (e.g., the inlet section, one or more tubes, and/or the nozzle section) may have a second composition different from the first composition. A composition of at least a portion of the heat-exchanger section (e.g., the inlet section, one or more tubes, and/or the nozzle section) may be graded. The thruster component may define one or more seamless bridges electrically connecting together at least two of the tubes of the heat-exchanger section. At least two of the tubes of the heat-exchanger section may be seamlessly joined together at ends thereof via a connecting section defining one or more hollow channels therethrough for flow of the propellant from one tube to the other.

In another aspect, embodiments of the invention feature a method of controlling motion of a spacecraft. A fluidic propellant is supplied to the inlet section of a joint-free, monolithic, integrated thruster component. The thruster component defines, without any joints therebetween, the inlet section, a nozzle section, and a heat-exchanger section fluidly coupled to the inlet section and the nozzle section. The heat-exchanger section may be electrically coupled to the inlet section and the nozzle section. Electrical potential is applied across at least a portion of the thruster component to resistively heat the heat-exchanger section. The heat-exchanger section includes, consists essentially of, or consists of a plurality of concentric tubes fluidly and electrically connected to each other. The heat-exchanger section heats propellant received from the inlet section. The heated propellant is expelled from the nozzle section to impart velocity to the spacecraft.

Embodiments of the invention may include one or more of the following in any of a variety of combinations. The thruster component may include, consist essentially of, or consist of one or more refractory metals. A wall thickness of at least one of the tubes of the heat-exchanger section may be no more than 800 µm, no more than 700 µm, no more than 600 µm, no more than 500 µm, no more than 400 µm, no more than 300 µm, no more than 200 µm, or no more than 100 µm. The thruster component may be fabricated by an additive manufacturing technique prior to supplying the propellant to the inlet section of the thruster component. The additive manufacturing technique may include, consist essentially of, or consist of layer-by-layer melting of a metal wire. The additive manufacturing technique may include, consist essentially of, or consist of layer-by-layer melting or sintering of metal powder disposed in a powder bed. A first portion of the heat-exchanger section (e.g., the inlet section, one or more tubes, and/or the nozzle section) may have a first composition. A second portion of the heat-exchanger section different from the first portion (e.g., the inlet section, one or more tubes, and/or the nozzle section) may have a second composition different from the first composition. A composition of at least a portion of the heat-exchanger section (e.g., the inlet section, one or more tubes, and/or the nozzle section) may be graded. The thruster component may define one or more seamless bridges electrically connecting together at least two of the tubes of the heat-exchanger section. At least two of the tubes of the heat-exchanger section may be seamlessly joined together at ends thereof via a connecting section defining one or more hollow channels therethrough for flow of the propellant from one tube to the other.

In yet another aspect, embodiments of the invention feature a thruster component for an electrothermal propulsion system. The component includes, consists essentially of, or consists of a joint-free monolith and two or more electrical terminals. The monolith defines an inlet section, a heat-exchanger section, and a nozzle section. The inlet section receives fluidic propellant. The heat-exchanger section heats propellant received from the inlet section. The heat-exchanger section includes, consists essentially of, or consists of a plurality of concentric tubes fluidly and electrically connected to each other (e.g., the tubes form a single fluidic path for propellant flow and at least neighboring tubes are connected together at least for electrical continuity). The nozzle section receives heated propellant from the heat-exchanger section and expels it. The electrical terminals receive electrical potential (e.g., current, voltage, or power) to resistively heat the heat-exchanger section. No joints are present between any of the inlet section, the heat-exchanger section, and the nozzle section.

Embodiments of the invention may include one or more of the following in any of a variety of combinations. The monolith may include, consist essentially of, or consist of one or more refractory metals. A wall thickness of at least one of the tubes of the heat-exchanger section may be no more than 800 µm, no more than 700 µm, no more than 600 µm, no more than 500 µm, no more than 400 µm, no more than 300 µm, no more than 200 µm, or no more than 100 µm. The monolith may be fabricated by an additive manufacturing technique. The additive manufacturing technique may include, consist essentially of, or consist of layer-by-layer melting of a metal wire. The additive manufacturing technique may include, consist essentially of, or consist of layer-by-layer melting or sintering of metal powder disposed in a powder bed. A first portion of the heat-exchanger section (e.g., the inlet section, one or more tubes, and/or the nozzle section) may have a first composition. A second portion of the heat-exchanger section different from the first portion (e.g., the inlet section, one or more tubes, and/or the nozzle section) may have a second composition different from the first composition. A composition of at least a portion of the heat-exchanger section (e.g., the inlet section, one or more tubes, and/or the nozzle section) may be graded. The monolith may define one or more seamless bridges electrically connecting together at least two of the tubes of the heat-exchanger section. At least two of the tubes of the heat-exchanger section may be seamlessly joined together at ends thereof via a connecting section defining one or more hollow channels therethrough for flow of the propellant from one tube to the other.

In another aspect, embodiments of the invention feature a thruster component for an electrothermal propulsion system. The component includes, consists essentially of, or consists of a monolith and two or more electrical terminals. The monolith defines an inlet section, a heat-exchanger section, and a nozzle section. The inlet section receives fluidic propellant. The heat-exchanger section heats propellant received from the inlet section. The heat-exchanger section includes, consists essentially of, or consists of a plurality of concentric tubes fluidly and electrically connected to each other (e.g., the tubes form a single fluidic path for propellant flow and at least neighboring tubes are connected together at least for electrical continuity). The nozzle section receives heated propellant from the heat-exchanger section and expels it. The electrical terminals receive electrical potential (e.g., current, voltage, or power) to resistively heat the heat-exchanger section. The monolith has a substantially uniform or uniform microstructure extending among and including the inlet section, the heat-exchanger section, and the nozzle section.

Embodiments of the invention may include one or more of the following in any of a variety of combinations. The monolith may include, consist essentially of, or consist of one or more refractory metals. A wall thickness of at least one of the tubes of the heat-exchanger section may be no more than 800 µm, no more than 700 µm, no more than 600 µm, no more than 500 µm, no more than 400 µm, no more than 300 µm, no more than 200 µm, or no more than 100 µm. The monolith may be fabricated by an additive manufacturing technique. The additive manufacturing technique may include, consist essentially of, or consist of layer-by-layer melting of a metal wire. The additive manufacturing technique may include, consist essentially of, or consist of layer-by-layer melting or sintering of metal powder disposed in a powder bed. A first portion of the heat-exchanger section (e.g., the inlet section, one or more tubes, and/or the nozzle section) may have a first composition. A second portion of the heat-exchanger section different from the first portion (e.g., the inlet section, one or more tubes, and/or the nozzle section) may have a second composition different from the first composition. A composition of at least a portion of the heat-exchanger section (e.g., the inlet section, one or more tubes, and/or the nozzle section) may be graded. The monolith may define one or more seamless bridges electrically connecting together at least two of the tubes of the heat-exchanger section. At least two of the tubes of the heat-exchanger section may be seamlessly joined together at ends thereof via a connecting section defining one or more hollow channels therethrough for flow of the propellant from one tube to the other.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately," "about," and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be present in non-zero concentrations and/or detectable via chemical analysis but do not contribute to function. As used herein, "consisting essentially of at least one metal" refers to a metal or a mixture of two or more metals but not compounds between a metal and a non-metallic element or chemical species such as oxygen, silicon, or nitrogen (e.g., metal nitrides, metal silicides, or metal oxides); such non-metallic elements or chemical species may be present, collectively or individually, in trace amounts, e.g., as impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 2A:
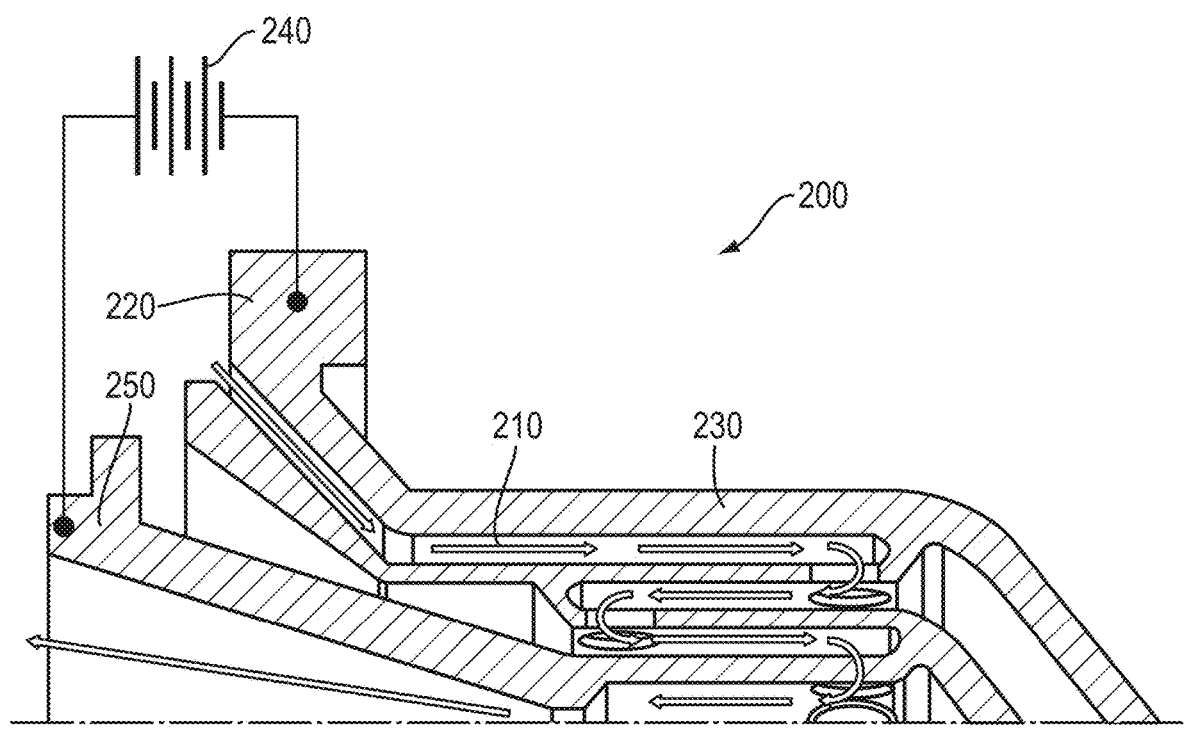
FIG. 2A is an axial-symmetric sectional view of an integrated thruster component of a resistojet in accordance with embodiments of the invention.

FIG. 2A is an axial-symmetric sectional view of an exemplary integrated thruster component 200 of a resistojet in accordance with embodiments of the invention, in which a path 210 traversed by the fluidic propellant is indicated by a series of arrows. As shown, the propellant flows into the thruster 200 via an inlet section 220 and then recirculates within a heat-exchanger section 230, where it is resistively heated in response to the electric potential applied to the terminals of the thruster 200 by a power source 240 (e.g., one or more batteries). (As utilized herein, a "terminal" or "electrical terminal" refers to any point at which electrical potential may be applied, whether or not specifically configured (via, e.g., an outlet, clip, or receptacle) to receive a wire or other conductor.) The heated propellant is then expelled through a nozzle section 250 to produce thrust.

The heat-exchanger section 230 increases the stagnation temperature of the propellant along its flow path 210. Unlike conventional resistojet designs, in resistojets in accordance with embodiments of the present invention, the heat-exchanger section 230 coincides with, and thus includes, the resistive heater utilized to heat the propellant. For more efficient heating of the heat-exchanger component 230, the walls of the concentric tubes therewithin may be quite thin, for example 1 mm or less. In the exemplary embodiment depicted in FIG. 2A, the heat-exchanger 230 features four concentric tubes having wall thicknesses of, from the innermost tube, approximately 500 µm, approximately 300 µm, approximately 300 µm, and approximately 800 µm, although even thinner thicknesses may be utilized. In general, the wall thickness of one or more tubes within a heat-exchanger section of a resistojet in accordance with embodiments of the invention may range from approximately 100 µm to approximately 1000 µm, and resistojets in accordance with embodiments of the invention may feature more (up to, e.g., six or eight) or fewer (e.g., one, two, or three) tubes (e.g., concentric tubes) in the heat-exchanger section.

The nozzle of nozzle section 250 may have a throat diameter ranging from, for example, approximately 0.3 mm to approximately 1 mm, or from approximately 0.4 mm to approximately 0.6 mm. The nozzle may have a diverging half-angle ranging from approximately 10° to approximately 20°.

Figure 1:
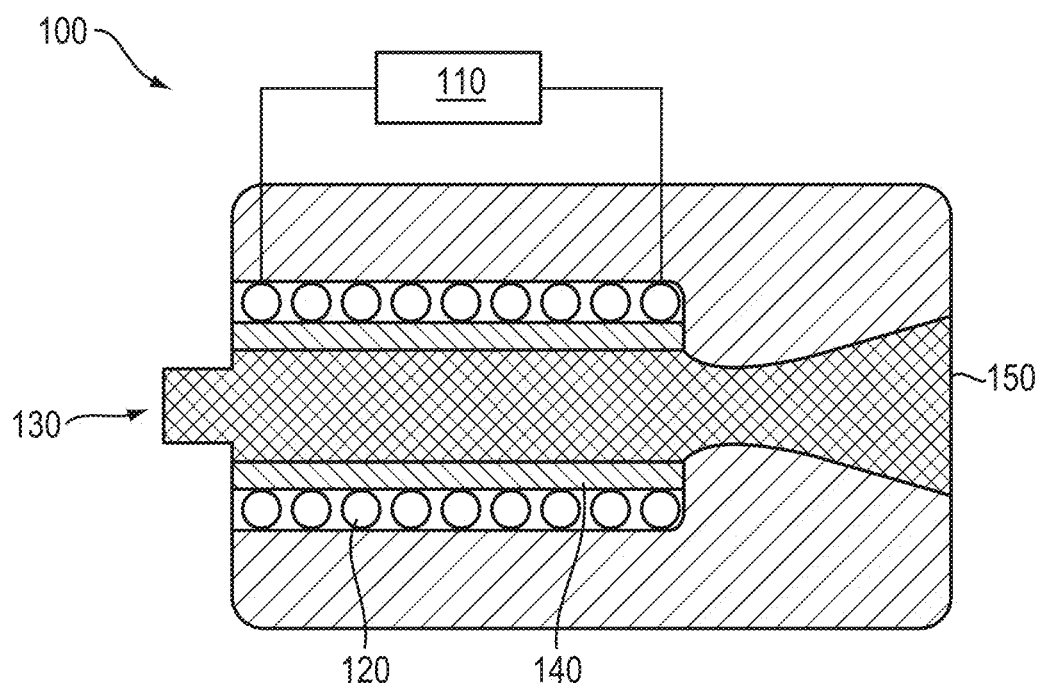
FIG. 1 is a schematic diagram of a conventional resistojet.
Figure 2B:
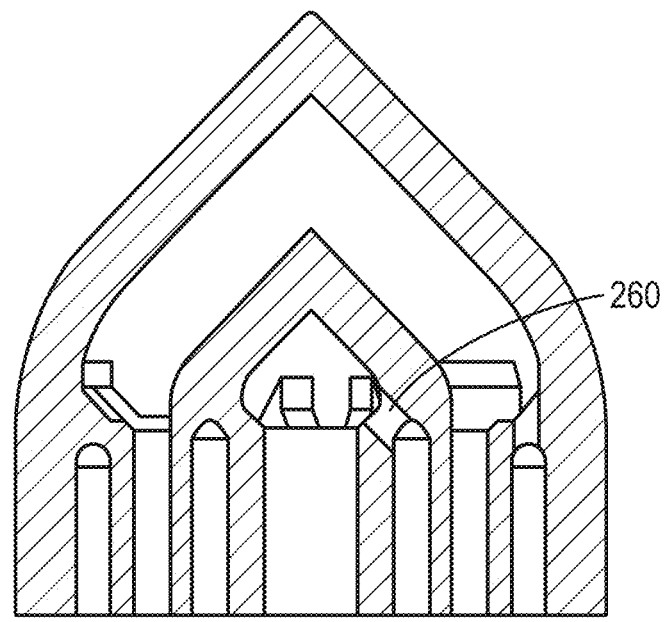
FIGS. 2B and 2C are partial sectional views of integrated thruster components having different tubular wall connections in accordance with embodiments of the invention.
Figure 2C:
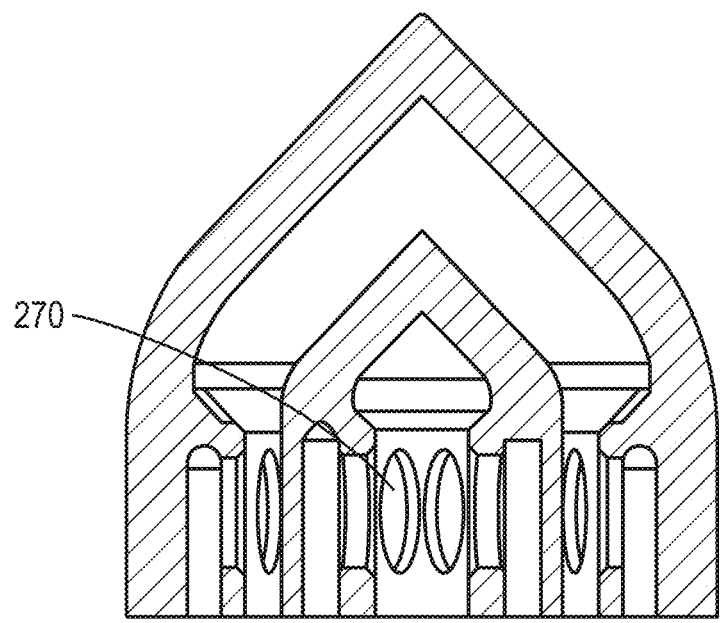

Embodiments of the present invention feature heat-exchanger sections 230 that also function as the resistive heating element for the propellant within the thruster component 200, and thus embodiments of the invention obviate the need for separate heating elements (as in FIG. 1). The thin tubular walls of the heat-exchanger section 230 that form concentric tubes are therefore connected to each other to ensure electrical continuity therebetween and heating of all of the tubes when the electrical potential is applied. FIGS. 2B and 2C are cross-sectional schematics of different configurations of wall connections utilized in accordance with embodiments of the invention. As shown in FIG. 2B, thruster component 200 may include small bridges or connectors 260 seamlessly extending form the terminal end of one tube wall to an adjoining one, thereby ensuring electrical continuity therebetween. The connectors 260 contain no joints or welds and may include, consist essentially of, or consist of the same material as that of the walls themselves. The connectors 260 may extend from one wall to another at an angle ranging from, for example, approximately 30° to approximately 60°, or approximately 45°. The thickness of connectors 260 may be no greater than the thickness of one or both of the walls spanned by the connector 260. In various embodiments, multiple different connectors 260 extend from one tube wall to another.

FIG. 2C depicts another embodiment of the present invention, in which the tubular walls of adjoining tubes seamlessly (and without joints or welds) connect together around substantially the entire circumference thereof, while the propellant flows from one tube to another through one or more hollow channels 270 formed in the wall. In various embodiments, multiple (e.g., 6-12) channels 270 are disposed around the circumference of one or more of the walls. The channels 270 may have one or more dimensions (e.g., width, length, diameter, etc.) ranging between approximately 200 µm and approximately 800 µm, or between approximately 400 µm and approximately 600 µm. As shown in FIG. 2C, the channels 270 are, in various embodiments, elliptical with a long axis oriented substantially parallel to the long axis of the thruster component 200 (i.e., substantially parallel to the direction from which propellant is expelled from the nozzle section 250).

Figure 3:
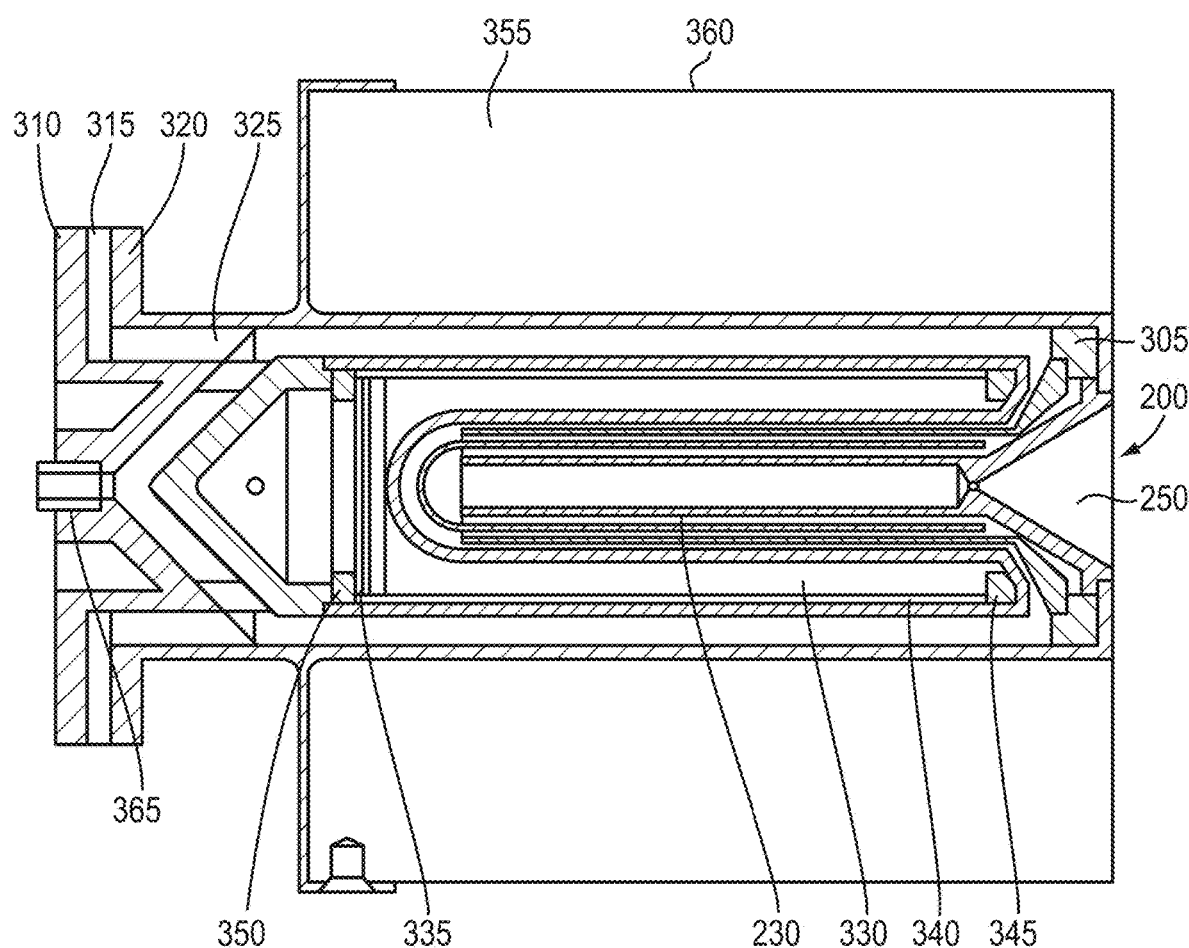
FIG. 3 is a schematic cross-section of a resistojet thruster in accordance with embodiments of the invention.

FIG. 3 is a schematic cross-section of an exemplary resistojet thruster 300 in accordance with embodiments of the present invention. As shown, the resistojet 300 features the above-described integrated thruster component 200 (with thin-wall resistive-heating heat-exchanger section 230), which facilitates a large contact area between the resistive-heating walls thereof and the flowing propellant. The thruster component 200 may be fixed in place at least in part by a nozzle ring 305 disposed around at least a portion of the nozzle section 250 of the thruster component 200. The nozzle ring 305 may include, consist essentially of, or consist of, for example, a thermal insulator such as a calcium silicate ceramic (e.g., DURATEC, available from Goodfellow Cambridge Ltd. —Ceramic and Glass Division of Huntingdon, England). In various embodiments of the invention, the pressure drop along the length of the heat-exchanger section 230 is only approximately 10 millibars to approximately 50 millibars while the gas pressure within the heat-exchanger section 230 ranges from approximately 1 bar to approximately 5 bar, enabling excellent thermal conductivity to the propellant. In various embodiments, the pressure within the heat-exchanger section 230 is approximately equal to the "chamber pressure," i.e., the pressure at the inlet section 220 and/or pressure at which the propellant is stored and/or supplied to the heat-exchanger section 230, enabling very accurate regulation of the thrust imparted by the resistojet 300. The excellent thermal contact between the heat-exchanger section 230 and the propellant advantageously avoids any significant temperature disparity between the maximum propellant temperature and the heat-exchanger temperature. Thus, embodiments of the invention eliminate the need for any elevated temperature (i.e., temperature above the intended propellant heating temperature), or extrinsic heater therefor, in any part of the heat-exchanger section 230 that would result in radiative and/or conductive heat losses and limit performance due to material limitations. That is, the maximum temperature of operation (e.g., limited by characteristics such as melting point of the material of the heat exchanger) may be utilized within the entire heat-exchanger section 230.

As shown in FIGS. 2A and 3, resistojet heat-exchanger sections in accordance with embodiments of the invention recirculate propellant multiple times within concentric tubes, and such flow paths advantageously convectively return heat back toward the center of the resistojet 300. This process regeneratively cools one or more outer portions of the resistojet 300 such as the heat-exchanger holder 310, the collar 315, the thrust stand 320, and/or the outer walls of the heat-exchanger section 230, thereby reducing the temperature of these outer portions of the resistojet 300 and further reducing radiative and conductive heat loss. In embodiments of the invention, the heat-exchanger holder 310 may impart a directional change (e.g., a swirl) to the propellant flow, which improves homogeneity of the heating of the propellant and may also prevent recirculation of the propellant. An insulator ring 325 may also be disposed within the resistojet 300 to provide further insulation. The heat-exchanger holder 310 and/or the thrust stand 320 may include, consist essentially of, or consist of, for example, a metal such as stainless steel. The collar 315 may include, consist essentially of, or consist of, for example, a thermal insulator such as a composite containing compressed glass and/or carbon fibers in a polymeric binder (e.g., KLINGERSIL Compressed Fibre Sheeting available from Klinger Ltd. of Bradford, United Kingdom).

Embodiments of the present invention also incorporate a two-part radiative heat shield that surrounds the thruster component 200. Specifically, embodiments of the invention may include a multi-layer concentric cylindrical shield 330 that reflects radiation back into the center of the thruster component 200. The number of layers within shield 330 may be selected in order to maximize thermal efficiency in terms of radiative and conductive losses. For example, the number of layers may be selected from numerical analysis of the required operating temperature vs. the number of radiative layers in order to increase thermal efficiency to a high level (e.g., >60%). In addition, embodiments of the invention may incorporate a circular disk multi-layer shield 335 opposite the nozzle section 250 of the thruster component 200 for the same purpose. As shown in FIG. 3, the outer wall of the shield 335 (or a holder therefor) may be in thermal contact with the outer flow channel via a thermal insulator 340 that regeneratively cools the outer radiation shield. Thermal insulator 340 thus limits the loss of thermal energy to the outer flow channel. Shields 330, 335 may include, consist essentially of, or consist of, for example, one or more refractory metals such as niobium, molybdenum, tantalum, tungsten, and/or rhenium. In various embodiments, shields 330, 335 include, consist essentially of, or consist of molybdenum. Additional insulation may be provided by a forward insulator ring 345 and/or a back insulator ring 350, as shown in FIG. 3. Forward insulator ring 345, back insulator ring 350, and/or thermal insulator 10 may include, consist essentially of, or consist of, for example, a thermal insulator such as a calcium silicate ceramic (e.g., DURATEC).

The outer flow channel for the propellant cools the thermal insulator 340 and also cools the thruster outer casing 320. Any remaining thermal energy is prevented from easily traversing this cooling channel by a large but lightweight case insulation 355 encasing the thruster component 200. The case insulation 355 raises the casing temperature, enabling the outer cooling channel to more effectively direct heat via convection back to the thruster component 200. Any thermal energy traversing the rear radiation shield 335 is also intercepted by the outer cooling channel, which returns at least a portion of that energy back to the flowing propellant. The case insulation 355 is itself encased within a thin external case 360, which may be coated with a low-emissivity coating to further limit any loss of thermal radiation. In various embodiments, a connector 365 provides a fluid connection between the resistojet and the source of fluid propellant (e.g., one or more tanks, not shown). The case insulation 355 may include, consist essentially of, or consist of, for example, a thermal insulator such as a porous silica- and/or alumina-based solid (e.g., MICROTHERM available from Promat Inc. of Maryville, Tenn.). The external case 360 may include, consist essentially of, or consist of, for example, a metal such as stainless steel.

As mentioned above, in embodiments of the present invention, the thruster component 200 is a unitary, joint-free monolith that may have a substantially uniform microstructure. In various embodiments, the thruster component 200 is fabricated from a bed of refractory metal powder by additive manufacturing. In other embodiments, the thruster component 200 is fabricated in layer-by-layer fashion using a refractory metal wire feedstock melted by an energy source such as a laser or an electron beam. Such fabrication techniques significantly reduce the number of parts within the resistojet 300, while also reducing the mass of the resistojet 300 and its thermal inertia, thereby allowing rapid heat-up of the heat-exchanger section 230.

Figure 4:
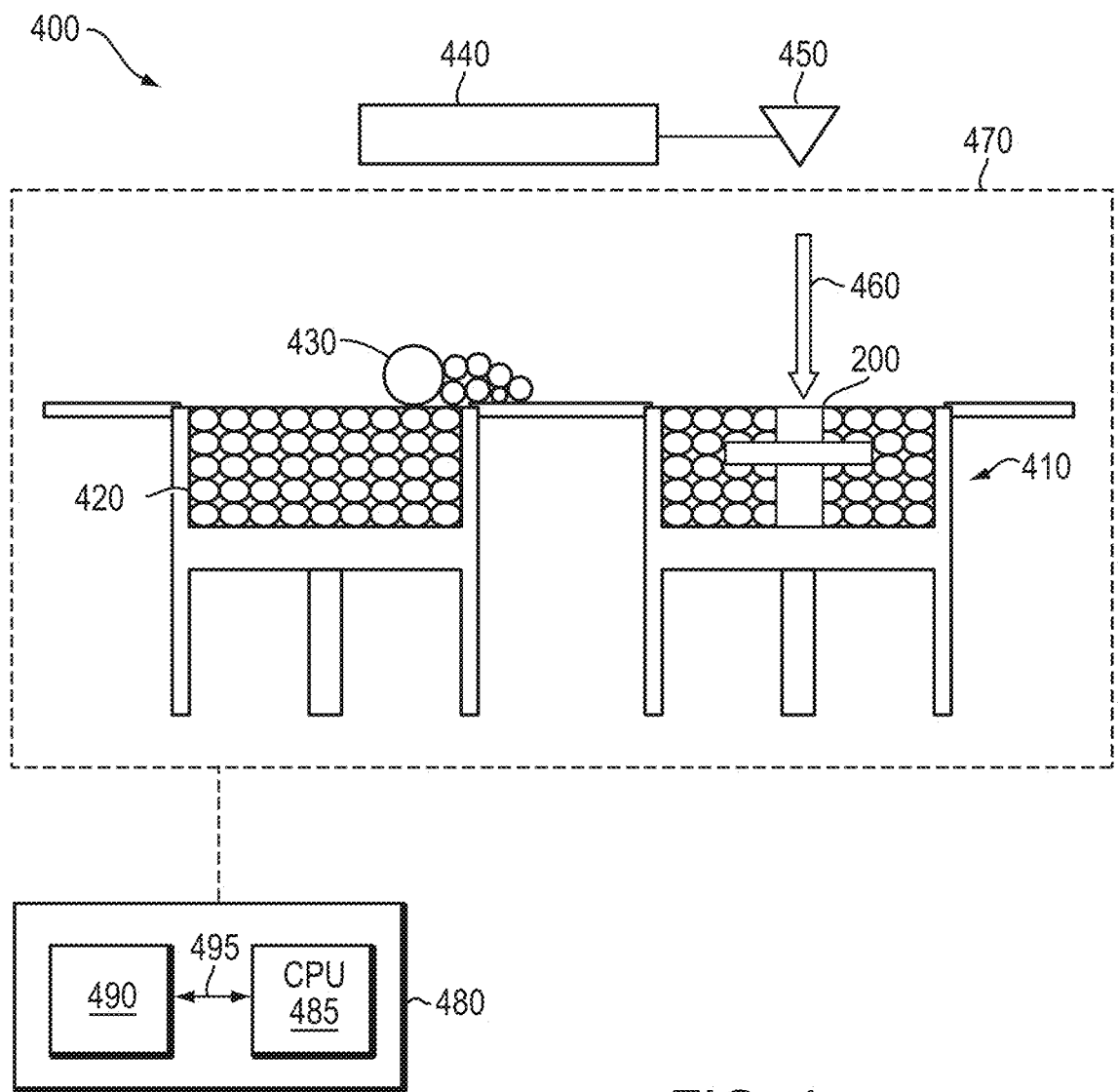
FIG. 4 is a schematic of an additive-manufacturing apparatus utilized to fabricate thruster components from metal powder in accordance with various embodiments of the invention.

In various embodiments, the thruster component 200 is fabricated using a laser melting system 400 that uses a powder bed of refractory metal powder. As shown in FIG. 4, a powder bed 410 is created by transferring powder across the work area from a powder supply 420 using a tool such as a roller or rake 430. Then, an energy source 440 (e.g., a laser or electron beam) delivers energy in the form of beam 460 to the surface of the bed 410 to sinter or melt the powder into the desired layer shape. The energy from the energy source 440 is delivered in the desired shape of the layer via a scanner 450 (that includes, consists essentially of, or consists of e.g., one or more mirrors or other reflectors) that redirects the beam 460. Arrangements and techniques enabling the motion (e.g., translation, rotation, etc.) of the scanner 450 or components thereof relative to the powder bed are known in the printing, plotting, and scanning arts and may be provided by one of skill in the art without undue experimentation. This process is repeated to create the three-dimensional thruster component 200 in layer-by-layer fashion, with the partially fabricated component being lowered after formation of each layer and additional powder being transferred into the powder bed 410 from the powder supply 420. Such processes enable fine dimensional control and fabrication of very thin walls, for example, as thin as 100 µm or less. Unused powder in the powder bed 410 may be recovered and recycled back into the powder supply 420 for subsequent use. As shown, some or all of the components of system 400 may be enclosed in a chamber 470. Although energy source 440 and scanner 450 are shown as being located outside of the chamber 470, in various embodiments one or both of these components are located within the chamber 470. Chamber 470 may contain an inert or protective atmosphere including, consisting essentially of, or consisting of, for example, nitrogen and/or one or more inert gases such as argon. After fabrication, the part may be subjected to additional sintering if desired (at temperatures of, e.g., over 1000°, over 1500° C., or even over 2000° C.); such sintering may increase the density of the printed part.

The sintering may be performed at low pressure (e.g., at least partial vacuum) or in a reducing (e.g., hydrogen or hydrogen-containing) atmosphere.

The various components of system 400 and their actions (e.g., downward movement of the powder bed, movement of the scanner assembly, upward movement of the powder supply, movement of the roller/rake 430, emission from source 440, etc.) may be controlled by a computer-based controller based on electronically stored representations of the thruster component 200. For example, the two-dimensional layers traced out by the fused powder may be extracted from a stored three-dimensional representation of the thruster component 200.

The computer-based control system (or "controller") 480 in accordance with embodiments of the present invention may include or consist essentially of a general-purpose computing device in the form of a computer including a processing unit (or "computer processor") 485, the system memory 490, and a system bus 495 that couples various system components including the system memory 490 to the processing unit 485. Computers typically include a variety of computer-readable media that can form part of the system memory 490 and be read by the processing unit 485. By way of example, and not limitation, computer readable media may include computer storage media and/or communication media. The system memory 490 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 485. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described herein. Illustratively, the programming language used may include assembly language, Ada, APL, Basic, C, C++, C*, COBOL, dBase, Forth, PYTHON, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 485 that executes commands and instructions may be a general-purpose computer processor, but may utilize any of a wide variety of other technologies including special-purpose hardware, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

Figure 5:
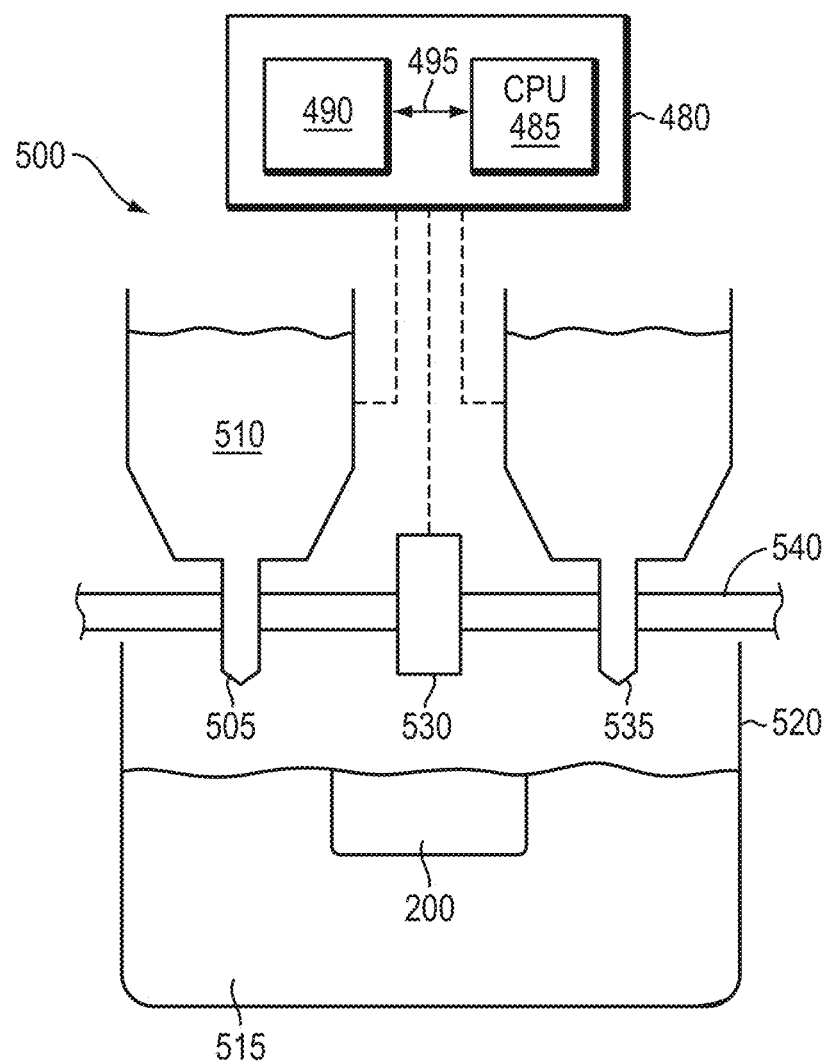
FIG. 5 is a schematic of an additive-manufacturing apparatus utilized to fabricate thruster components from metal powder in accordance with various embodiments of the invention.

In accordance with embodiments of the invention, metal powder may be utilized to form the thruster component 200 by other additive manufacturing techniques. In an exemplary embodiment, a printing apparatus 500 is utilized to fabricate the thruster component 200 in accordance with embodiments of the invention, as shown in FIG. 5. As shown, a printing head 505 is utilized to disperse a liquid binder or adhesive 510 (which may include, consist essentially of, or consist of, e.g., one or more polymeric materials) into a powder bed 515 that may be contained within a build container 520. The powder bed 515 contains the metal powder, and the printing head 505 disperses the liquid binder layer by layer in approximately the desired shape and size for the final thruster component 200 (shown in FIG. 5 as partially defined via dispersal of multiple layers of binder 510 into the powder bed 515). After each layer of the binder 510 is dispersed over the powder bed 515, the layer of binder 510 is typically cured by, e.g., application of heat and/or light (e.g., infrared light or ultraviolet light). For example, a curing head 530 may be moved over the powder bed 515 while emitting heat and/or light onto the layer of binder 510. As such, the curing head 530 may include, consist essentially of, or consist of one or more heaters (e.g., resistive heaters) and/or light sources (e.g., lamps, light-emitting diodes, lasers, etc.). After each layer of the binder 510 is cured, another layer of the powder is dispensed into the powder bed 515 over the partially completed part by a powder dispersal head 535, and the process is repeated. After each layer, the powder bed 515 may be translated vertically (i.e., in the "z" direction) relative to the printing head 505, the curing head 530, and the powder dispersal head 535 (i.e., any of the tools and/or the powder bed may be translated) to accommodate the growing part.

The printing head 505, the curing head 530, and the powder dispersal head 535 may move over the powder bed 515 in one, two, or three dimensions. As shown in FIG. 5, these tools may move via a gantry 540 or other framework suspended over the powder bed 515, for example, using one or more motors, actuators, and/or stepper motors. Although FIG. 5 depicts these tools as separate and independently movable, in various embodiments the printing head 505, the curing head 530, and the powder dispersal head 535 are portions of a single unified fabrication head that is movable over the powder bed and dispenses binder, cures the binder, and dispenses powder from different portions thereof. Arrangements enabling the motion of the dispersal and curing tools relative to the powder bed are known in the printing, plotting, and scanning arts and may be provided by one of skill in the art without undue experimentation. In other embodiments, the build container 520 itself may be moved relative to the tools in addition to or instead of one or more of the tools moving. Such relative movement may be controlled by computer-based controller 480 based on electronically stored representations of the part to be fabricated. For example, the two-dimensional layers traced out by the printing head 505 may be extracted from a stored three-dimensional representation of the final part stored in memory 490.

After the final layer of the binder 510 has been dispersed and cured and printing is complete, the thruster component 200 is composed of the powder particles held together by the cured binder material. The thruster component 200 may then be sintered to fuse the particles together and melt away the binder material and possibly leave empty pores (if desired; such pores may subsequently be infiltrated with another material via, e.g., dispersing the material (e.g., one or more metals) in powder or liquid form on the part and sintering). For example, the part may be sintered for times up to approximately 1 hour, or even longer, and a temperatures ranging from approximately 1200° C. to approximately 1600° C. (e.g., from approximately 1400° C. to approximately 1500° C.). The sintering may be performed at low pressure (e.g., at least partial vacuum) or in a reducing (e.g., hydrogen or hydrogen-containing) atmosphere. The sintering process may also result in densification and shrinkage of the part. Pressure may also be applied to the thruster component 200 during sintering; thus, the thruster component 200 may be sintered within a hot isostatic pressing process. Alternatively or in addition, the thruster component 200 may be cold isostatically pressed or hot isostatically pressed after sintering.

Figure 6:
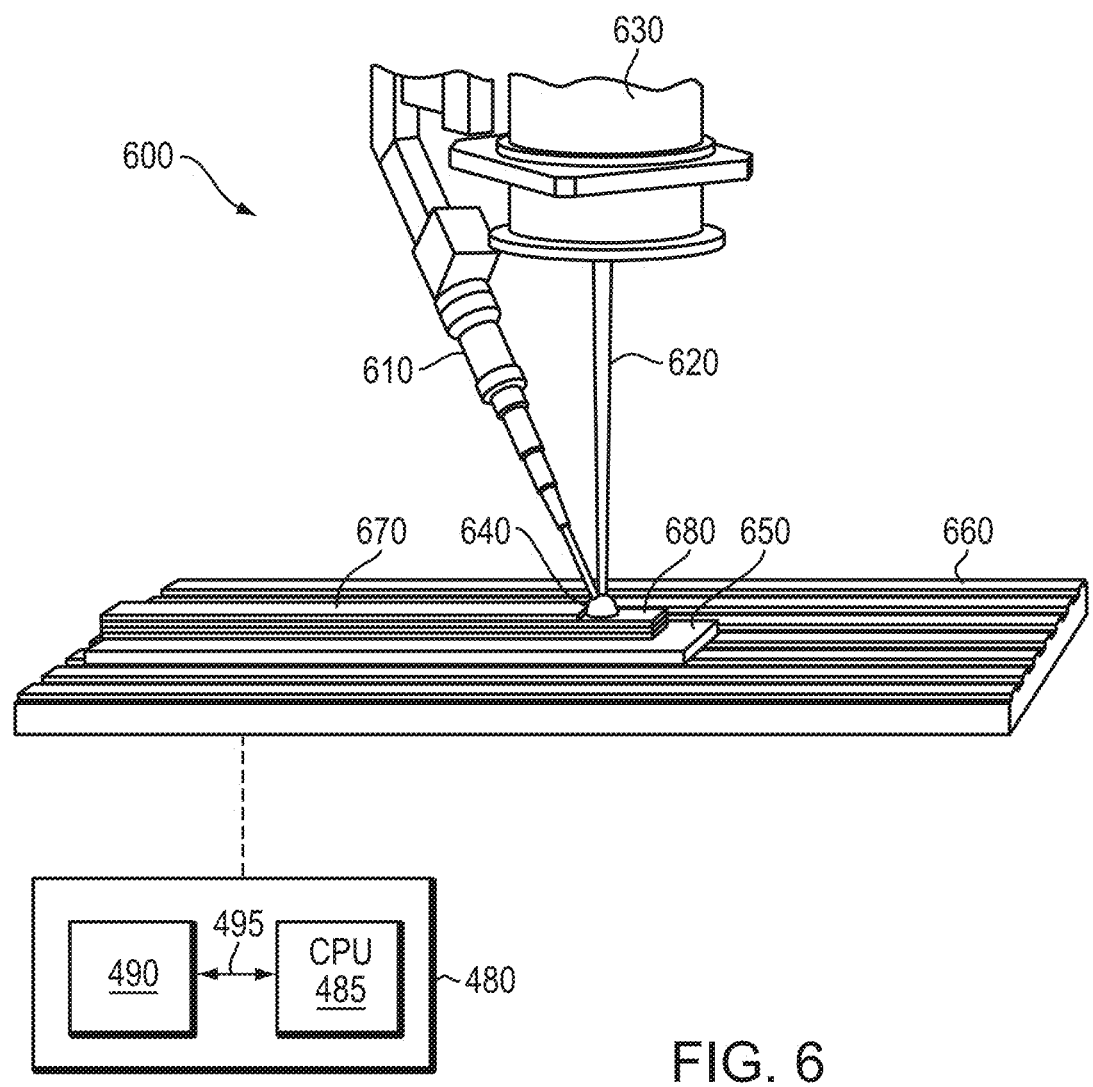
FIG. 6 is a schematic of an additive-manufacturing apparatus utilized to fabricate thruster components from metal wire in accordance with various embodiments of the invention.

In other embodiments of the invention, the thruster component 200 may be fabricated in layer-by-layer fashion by melting of a refractory metal wire using an additive manufacturing assembly 600. For example, as shown in FIG. 6, the wire may be incrementally fed, using a wire feeder 610, into the path of a high-energy source 620 (e.g., an electron beam or a laser beam emitted by a laser or electron-beam source 630), which melts the tip of the wire to form a small molten pool (or "bead" or "puddle") 640. All or a portion of the assembly 800 may be disposed within a vacuum chamber to prevent or substantially reduce contamination from the ambient environment.

Relative movement between a substrate 650 (which may be, as shown, disposed on a platform 660) supporting the deposit and the wire/gun assembly results in the thruster component 200 being fabricated in a layer-by-layer fashion. Such relative motion results in the continuous formation of a layer 670 of the three-dimensional object from continuous formation of molten pool 640 at the tip of the wire. As shown in FIG. 8, all or a portion of layer 870 may be formed over one or more previously formed layers 680. The relative movement (i.e., movement of the platform 660, the wire/gun assembly, or both) may be controlled by computer-based controller 480 based on electronically stored representations of the thruster component 200 to be fabricated. For example, the two-dimensional layers traced out by the melting wire may be extracted from a stored three-dimensional representation of the final thruster component 200 stored in memory 490. After the additive manufacturing process is complete, the thruster component 200 may be removed from the platform and subjected to final machining and/or polishing, if necessary or desired. After fabrication, the part may be subjected to additional sintering if desired (at temperatures of, e.g., over 1000°, over 1500° C., or even over 2000° C.); such sintering may increase the density of the printed part. The sintering may be performed at low pressure (e.g., at least partial vacuum) or in a reducing (e.g., hydrogen or hydrogen-containing) atmosphere.

In various embodiments of the invention, the use of additive manufacturing to fabricate the thruster component 200 enables portions of the thruster component 200 to include, consist essentially of, or consist of different materials or different combinations of materials while still being a seamless, unitary structure. For example, the feedstock powder or wire may be changed between and/or within layers deposited or fabricated by additive manufacturing to form novel structures difficult or impossible to fabricate by other techniques. In an exemplary embodiment, different portions of the thruster component 200 may be composed of materials having different resistivities and/or different melting points. For example, one or more alloying elements (e.g., one or more refractory metals) may be added to all or a portion of the heat-exchanger section 230 in order to increase its resistivity (and therefore its ability to resistively heat the propellant) for a given applied electrical potential. In another exemplary embodiment, a portion of the thruster component 200 (e.g., all or a portion of the nozzle section 250) may be composed of a material having a higher melting point, thereby improving its mechanical performance when subjected to the heated propellant. The composition of all or a portion of the thruster component 200 may even be graded (e.g., step-graded, linear-graded, etc.) from one composition to another in order to engineer the temperature profile for the thruster component 200 during operation. Temperature and flow profiles through the thruster component 200 as a function of compositional profile therethrough may be modelled straightforwardly by those of skill in the art using known techniques and software (e.g., COMSOL Multiphysics software available from COMSOL, Inc. of Burlington, Mass.) without undue experimentation.

Figure 7A:
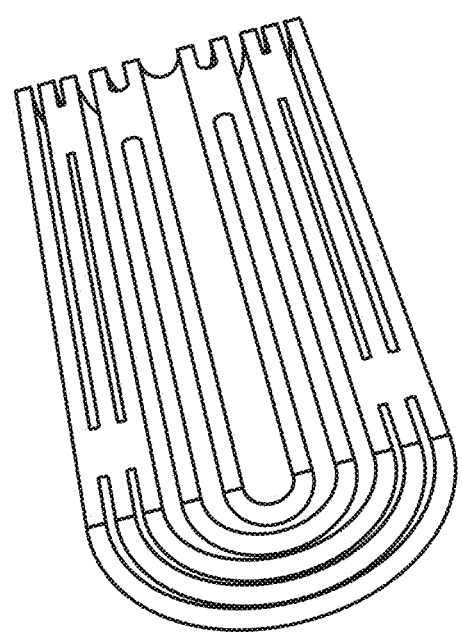
FIG. 7A is a photograph of a partial heat-exchanger section of a resistojet fabricated by additive manufacturing in accordance with various embodiments of the invention.
Figure 7B:
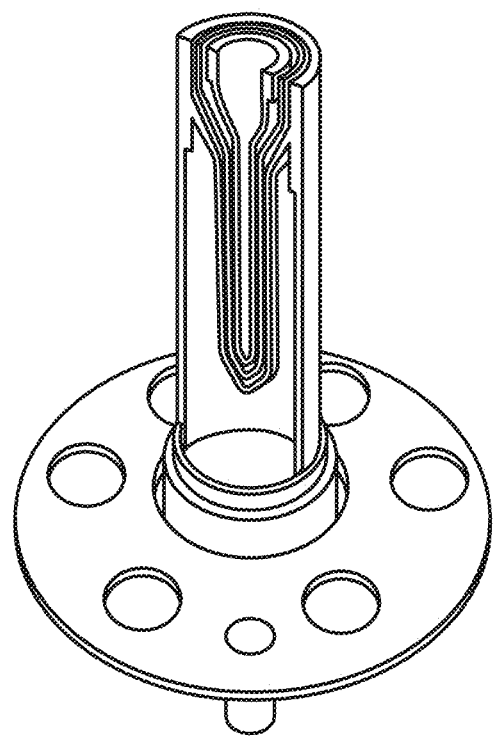
FIG. 7B is a photograph of a section of a thruster component of a resistojet fabricated by additive manufacturing in accordance with various embodiments of the invention.

In various embodiments of the invention, the thruster component 200 is fabricated via additive manufacturing vertically, starting at the nozzle portion 250 (i.e., in the direction extending from left to right in FIG. 2A but in the orientation shown in FIG. 7B). In various embodiments, this printing configuration enables superior control of, e.g., the thickness of the walls of the heat-exchanger section 230 and the size and shape of the nozzle section 250.

In various embodiments, any remnant surface roughness or irregularities in the nozzle section 250 may be removed via drilling and/or polishing of the nozzle section 250 after fabrication by additive manufacturing. For example, the nozzle section 250 may be polished via electrode discharge machining, chemical etching, and/or computer numerical control (CNC) machining. In various embodiments, at least the inner surface of the nozzle section 250 has an arithmetic average surface roughness $R_a$ of no more than approximately 2 µm, no more than approximately 1.7 µm, no more than approximately 1.5 µm, or no more than approximately 1.2 µm. In various embodiments, the surface roughness of at least the inner surface of the nozzle section 250 has a maximum height $R_t$ of no more than approximately 12 µm, no more than approximately 10 µm, no more than approximately 8 µm, or no more than approximately 5 µm.

FIG. 7A shows a portion of a thruster component 200 produced by additive manufacturing in accordance with embodiments of the invention. Embodiments of the invention advantageously enable the formation of channel flow holes between the concentric tubes of the heat-exchanger section 230 while precisely controlling the resistive cross-section of the heat-exchanger section 230. This controls heat dissipation to prevent overheating that might result from reduced cross-sectional area in the heat-exchanger section 230 proximate the channel flow holes that may result using conventional manufacturing techniques. FIG. 7B shows a sectioned view of a thruster component 200 successfully manufactured by additive manufacturing in accordance with embodiments of the invention. As shown, the walls of the concentric tubes of the heat-exchanger section are thin and have a substantially constant thickness, enabling superior performance when propelling a spacecraft via heated propellant.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An electrothermal propulsion system for imparting velocity to a spacecraft, the electrothermal propulsion system comprising:
    a joint-free, monolithic, integrated thruster component defining:
    an inlet section for receiving fluidic propellant,
    a heat-exchanger section for heating the fluidic propellant received from the inlet section, thereby forming heated propellant, the heat-exchanger section comprising four or more concentric tubes fluidly and electrically connected to each other, and
    a nozzle section for receiving the heated propellant from the heat-exchanger section and expelling the heated propellant, wherein the four or more concentric tubes of the heat-exchanger section form a single fluidic path for flow of the heated propellant to the nozzle section; and
    a power source for applying an electrical potential between the inlet section and the nozzle section to resistively heat the heat-exchanger section to an operating temperature of 3000 K or higher,
    wherein (i) no joints are present between any of the inlet section, the heat-exchanger section, and the nozzle section of the joint-free, monolithic, integrated thruster component and (ii) a wall thickness of each tube of the four or more concentric tubes is no more than 800 µm.

2. The electrothermal propulsion system of claim 1, wherein the joint-free, monolithic, integrated thruster component comprises one or more refractory metals.

3. The electrothermal propulsion system of claim 1, wherein the joint-free, monolithic, integrated thruster component is fabricated by an additive manufacturing technique.

4. The electrothermal propulsion system of claim 3, wherein the additive manufacturing technique comprises layer-by-layer melting of a metal wire.

5. The electrothermal propulsion system of claim 3, wherein the additive manufacturing technique comprises layer-by-layer melting or sintering of metal powder disposed in a powder bed.

6. The electrothermal propulsion system of claim 1, wherein a first portion of the heat-exchanger section has a first composition and a second portion of the heat-exchanger section has a second composition different from the first composition.

7. The electrothermal propulsion system of claim 1, wherein a composition of at least a portion of the heat-exchanger section is graded.

8. The electrothermal propulsion system of claim 1, wherein the joint-free, monolithic, integrated thruster component defines one or more seamless bridges electrically connecting together at least two tubes of the plurality of four or more concentric tubes of the heat-exchanger section.

9. The electrothermal propulsion system of claim 1, wherein at least two tubes of the four or more concentric tubes of the heat-exchanger section are seamlessly joined together at ends thereof via a connecting section defining one or more hollow channels therethrough for flow of the fluidic propellant from one tube of the at least two tubes to the other tube of the at least two tubes.

10. The electrothermal propulsion system of claim 1, wherein the nozzle section has a diverging half-angle ranging from 10° to 20°.

11. The electrothermal propulsion system of claim 1, wherein wall thicknesses of at least two tubes of the four or more concentric tubes are different from each other.

12. A method of controlling motion of a spacecraft, the method comprising:
supplying a fluidic propellant to an inlet section of a joint-free, monolithic, integrated thruster component, the joint-free, monolithic, integrated thruster component defining, without any joints therebetween, the inlet section, a nozzle section, and a heat-exchanger section fluidly coupled to the inlet section and the nozzle section;
applying an electrical potential across at least a portion of the joint-free, monolithic, integrated thruster component to resistively heat the heat-exchanger section to an operating temperature of 3000 K or higher, wherein (i) the heat-exchanger section comprises a plurality of four or more concentric tubes fluidly and electrically connected to each other, (ii) a wall thickness of each tube of the four or more concentric tubes is no more than 800 μm, and (iii) the fluidic propellant received from the inlet section is heated only by the heat-exchanger section, thereby forming heated propellant; and
expelling only the heated propellant from the nozzle section to impart velocity to the spacecraft.

13. The method of claim 12, wherein the joint-free, monolithic, integrated thruster component comprises one or more refractory metals.

14. The method of claim 12, further comprising, prior to supplying the fluidic propellant to the inlet section of the joint-free, monolithic, integrated thruster component, fabricating the joint-free, monolithic, integrated thruster component by an additive manufacturing technique.

15. The method of claim 14, wherein the additive manufacturing technique comprises layer-by-layer melting of a metal wire.

16. The method of claim 14, wherein the additive manufacturing technique comprises layer-by-layer melting or sintering of metal powder disposed in a powder bed.

17. The method of claim 12, wherein a first portion of the heat-exchanger section has a first composition and a second portion of the heat-exchanger section has a second composition different from the first composition.

18. The method of claim 12, wherein a composition of at least a portion of the heat-exchanger section is graded.

19. The method of claim 12, wherein the joint-free, monolithic, integrated thruster component defines one or more seamless bridges electrically connecting together at least two tubes of the four or more concentric tubes of the heat-exchanger section.

20. The method of claim 12, wherein at least two tubes of the four or more concentric tubes of the heat-exchanger section are seamlessly joined together at ends thereof via a connecting section defining one or more hollow channels therethrough for flow of the fluidic propellant from one tube of the at least two tubes to the other tube of the at least two tubes.

21. The method of claim 12, wherein the fluidic propellant consists of one or more inert gases.

22. The method of claim 12, wherein the fluidic propellant consists of xenon gas.

23. The method of claim 12, wherein the four or more concentric tubes of the heat-exchanger section form a single fluidic path for flow of the heated propellant to the nozzle section.

24. The method of claim 12, wherein the nozzle section has a diverging half-angle ranging from 10° to 20°.

25. The method of claim 12, wherein wall thicknesses of at least two tubes of the four or more concentric tubes are different from each other.

\* \* \* \* \*